(12) United States Patent
Ye et al.

(10) Patent No.: US 9,538,509 B2
(45) Date of Patent: Jan. 3, 2017

(54) METHOD AND APPARATUS FOR MULTI-MODE CONTROL INFORMATION ON UPLINK CHANNEL

(71) Applicants: Sigen Ye, New Providence, NJ (US); Matthew P J Baker, Canterbury (GB)

(72) Inventors: Sigen Ye, New Providence, NJ (US); Matthew P J Baker, Canterbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/799,064

(22) Filed: Mar. 13, 2013

(65) Prior Publication Data

US 2013/0308558 A1 Nov. 21, 2013

Related U.S. Application Data

(60) Provisional application No. 61/648,748, filed on May 18, 2012.

(51) Int. Cl.
*H04W 72/04* (2009.01)
*H04W 72/02* (2009.01)
*H04W 24/10* (2009.01)

(52) U.S. Cl.
CPC ......... *H04W 72/0413* (2013.01); *H04W 72/02* (2013.01); *H04W 24/10* (2013.01)

(58) Field of Classification Search
CPC .. H04W 72/0413; H04W 24/10; H04W 72/02; H04W 52/325; H04W 52/42; H04W 52/34; H04L 1/0026; H04L 1/0059; H04L 1/0088; H04L 1/1861
USPC ........ 370/203, 204–215, 229–240, 310–337, 370/338–350, 351–394, 395.1, 395.3, 370/395.4, 395.41, 395.42, 395.5, 395.52, 370/431–457, 458–463, 464–497, 370/498–522, 523–520, 521–529
See application file for complete search history.

(56) References Cited

U.S. PATENT DOCUMENTS

| | | | |
|---|---|---|---|
| 2011/0249578 A1* | 10/2011 | Nayeb Nazar et al. | 370/252 |
| 2012/0039280 A1* | 2/2012 | Chen et al. | 370/329 |
| 2012/0207108 A1* | 8/2012 | Larsson et al. | 370/329 |

* cited by examiner

*Primary Examiner* — Jung-Jen Liu
(74) *Attorney, Agent, or Firm* — Harness, Dickey & Pierce, P.L.C.

(57) ABSTRACT

One embodiment includes a method for selecting, by a mobile unit, one of a plurality of control information reporting modes based on at least one of a control information transmission type and a payload size. The method further includes transmitting, by the mobile unit, one or more UCI report(s) to the base station using the selected UCI reporting mode.

18 Claims, 5 Drawing Sheets

METHOD AND APPARATUS FOR MULTI-MODE CONTROL INFORMATION ON UPLINK CHANNEL

PRIORITY INFORMATION

This application claims priority from U.S. Provisional Application No. 61/648,748 filed May 18, 2012, the contents of which are incorporated herein by reference in their entirety.

BACKGROUND

Embodiments relate to transmitting channel state information (CSI) and/or acknowledgement information in a wireless network, for example, a Long Term Evolution (LTE) wireless network.

The 3GPP Long Term Evolution (LTE) represents a major advance in cellular technology. LTE is designed to meet carrier needs for high-speed data and media transport as well as high-capacity voice support well into the next decade. LTE encompasses high-speed data, multimedia unicast and multimedia broadcast services.

The LTE physical layer (PHY) is an efficient mechanism for conveying both data and control information between an enhanced base station (e-NodeB) and mobile user equipment (UE). The LTE PHY employs some advanced technologies to cellular applications. These technologies include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

In 3GPP LTE Rel-10 carrier aggregation (CA), dropping of CSI that is configured to be sent periodically occurs in the following cases: (1) when multiple Channel State Information (CSI) report(s) collide in the same sub-frame, only one CSI report is transmitted, and the others are dropped; and (2) when CSI report(s) collides with Hybrid Automatic Repeat Request-Acknowledgement (HARQ-ACK) in the same sub-frame, CSI report(s) are dropped.

Enhancements are desirable to improve or avoid CSI dropping in CA. One option that has been proposed is to use a data channel, the Physical Uplink Shared Channel (PUSCH), to carry CSI that is configured to be sent periodically. Since PUSCH can carry a much bigger payload than Physical Uplink Control Channel PUCCH, multiple CSI reports (up to 5 component carriers, as defined in CA currently) can be carried in the same sub-frame without any report being dropped.

The problem is how to make best use of PUSCH to provide as much useful CSI information as possible in an efficient way, given that the smallest unit of resource that can be allocated on PUSCH is significantly larger than the amount of CSI that is typically transmitted periodically.

There are a few known solutions on how to use PUSCH to carry CSI:

(1) The e-NodeB can request the UE to report a single individual aperiodic CSI report (which conveys more CSI than a periodic one). This is already supported in Rel-10. The drawback is that for each aperiodic CSI request, the e-NodeB needs to send a Downlink Control Information (DCI) message on Physical Downlink Control Channel (PDCCH). This can result in significant overhead on PDCCH.

(2) Use higher layer signaling to configure periodic resource on PUSCH, and reuse existing periodic reporting modes. Existing periodic modes have relatively smaller payload size, up to 55 bits for 5 component carriers. This can be an inefficient way of using one Physical Resource Block (PRB) on PUSCH since one PRB is significantly larger than this.

(3) Define a different reporting mode for periodic CSI on PUSCH with more comprehensive CSI feedback (thus larger payload) in each sub-frame. One possible way is to reuse the existing aperiodic reporting formats, but sent periodically instead of as single individually-requested reports. This can better take advantage of the one-PRB resource on PUSCH. The disadvantage is that when the CSI reports occur together with UL data, CSI needs to be multiplexed with UL data, and when the CSI payload is large, the impact on UL data is larger because it takes more resource away from UL data.

(4) Largely reuse the aperiodic CSI mechanism in 3GPP LTE Rel-10 (as in the first option), but allow dynamic triggering of small or large payload size CSI reporting. This is achieved by re-defining the meaning of CSI request field in the DCI format. It has the same drawback as the first option, namely, large overhead on PDCCH.

In 3GPP LTE Rel-10, HARQ-ACK bundling, either in time domain or spatial domain, is applied in certain cases in order to reduce the payload size of HARQ-ACK to fit into the PUCCH transmission formats. When HARQ-ACK bundling is performed, there is a loss in downlink throughput as a result of some unnecessary negative acknowledgements due to bundling.

Both CSI and HARQ-ACK are considered as uplink control information (UCI).

SUMMARY

Some example embodiments relate methods and/or apparatuses for transmitting one or more control information report(s) from a UE to a base station in an efficient manner so as to eliminate and/or minimize the probability of CSIs being dropped.

In one example embodiment, a method includes selecting, by a mobile unit, one of a plurality of control information reporting modes based on at least one of a control information transmission type and a payload size. The method further includes transmitting, by the mobile unit, one or more control information report(s) to the base station using the selected control information reporting mode.

In another example embodiment, the method further includes determining whether one or more control information need to be reported and constructing the one or more control information report(s) to be transmitted to the base station upon determining that the one or more control information need to be reported.

In yet another example embodiment, the control information is at least one of channel state information (CSI) and acknowledgement information.

In yet another example embodiment, the control information transmission type is the control information report being multiplexed with uplink (UL) data.

In yet another example embodiment, the payload size is at least one of a payload size of the one or more control information report(s) and a payload size of the UL data.

In yet another example embodiment, the one or more control information report(s) is transmitted over a UL data channel.

In yet another example embodiment, the selecting includes selecting, from among the plurality of control information reporting modes, a control information reporting mode with a smaller payload size compared to at least one other control information reporting mode with a larger payload size, upon the one or more control information report(s) being multiplexed with the UL data.

In yet another example embodiment, the selecting includes selecting, from among the plurality of control information reporting modes, a control information reporting mode with a smaller payload size compared to at least one other control information reporting mode with a larger payload size, only if the payload size of the control information reporting mode with the smaller payload size multiplexed by the UL data exceeds a first threshold.

In yet another example embodiment, the selecting includes selecting, from among the plurality of control information reporting modes, a control information reporting mode with a smaller payload size compared to at least one other control information reporting mode with a larger payload size, if an amount of data with which the control information according to the control information reporting mode with the smaller payload size is multiplexed, is larger than a second threshold.

In yet another example embodiment, the selecting includes selecting, from among the plurality of control information reporting modes, from among the plurality of control information reporting modes, a control information reporting mode with a smaller payload size compared to at least one other control information reporting mode with a larger payload size, if an amount of resource used for multiplexing the one or more control information report(s) with the UL data is less than a third threshold, and the selecting includes selecting, from among the control information reporting modes, the at least one other control information reporting mode with the larger payload size if the amount of resource used for multiplexing the one or more control information report(s) with the UL data is greater than the third threshold.

In yet another example embodiment, a method includes determining, by a base station, one of a plurality of control information reporting modes based on at least one of a control information transmission type and a payload size. The method further includes receiving, by the base station, information over an uplink data channel and processing, by the base station, one or more control information report(s) from the received information using the determined control information reporting mode.

In yet another example embodiment, the method further includes determining whether the received information includes one or more control information report(s), wherein the processing is carried out upon determining that the received information includes one or more control information report(s).

In yet another example embodiment, a mobile device includes a processor configured to select one of a plurality of control information reporting modes based on at least one of a control information transmission type and a payload size. The processor is further configured to transmit one or more control information report(s) to a base station using the selected control information reporting mode.

In yet another example embodiment, the processor is further configured to determine whether one or more control information need to be reported and construct the one or more control information report(s) to be transmitted to the base station upon determining that the one or more control information need to be reported.

In yet another example embodiment, a base station includes a processor configured to determine one of a plurality of control information reporting modes based on at least one of a control information transmission type and a payload size. The processor is further configured to receive information over an uplink data channel and process one or more control information report(s) from the received information using the determined control information reporting mode.

In yet another example embodiment, the processor of the base station is further configured to determine whether the received information includes one or more control information report(s), wherein the processing is carried out upon determining that the received information includes one or more control information report(s).

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. The present disclosure may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

As used herein, the term "mobile unit" may be considered synonymous to, and may hereafter be occasionally referred to, as a client, user equipment, mobile station, mobile user, mobile, subscriber, user, remote station, access terminal, receiver, etc., and may describe a remote user of wireless resources in a wireless communication network.

Similarly, as used herein, the term "evolved Node B" or "e-NodeB" may be considered synonymous to, and may hereafter be occasionally referred to, as a Node B, base station, base transceiver station (BTS), etc., and may describe a transceiver in communication with and providing wireless resources to mobiles in a wireless communication network which may span multiple technology generations. As discussed herein, base stations may have all functionally associated with conventional, well-known base stations in addition to the capability to perform the methods discussed herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 1:
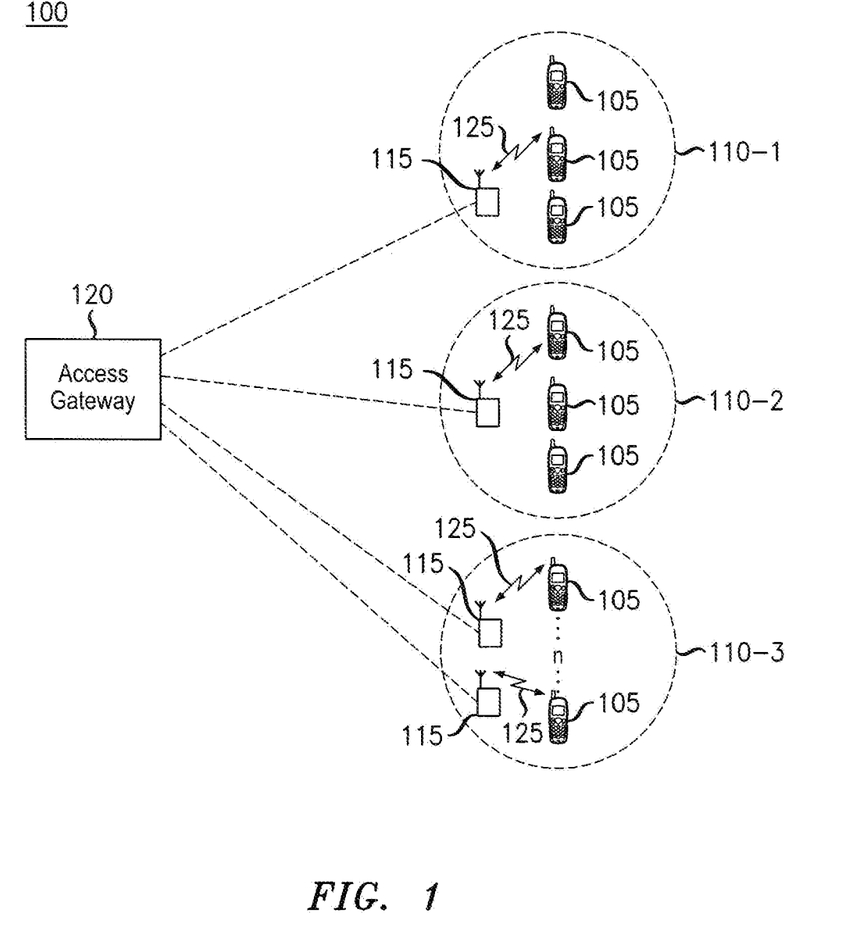
FIG. 1 illustrates a block diagram of a wireless communication network according to one example embodiment.

FIG. 1 illustrates a block diagram of a wireless communication network according to one example embodiment. FIG. 1 illustrates a wireless communication network 100 that includes an access gateway 120 having one or more associated e-NodeBs 115. The access gateway 120 coverage area may include a plurality of cells 110-1, 110-2, 110-3.

The wireless communication network 100 may be an Evolved Universal Terrestrial Radio Access Network (E-UTRAN). Long Term Evolution (LTE) is the name given to a project to improve the Universal Mobile Telecommunications System (UMTS) standard to cope with future requirements. In one aspect, UMTS has been modified to provide for the E-UTRAN as a fourth generation (4G) wireless network.

An E-UTRAN may include e-NodeBs 115, which provide the Evolved Universal Terrestrial Radio Access (E-UTRA) user plane (PDCP/RLC/MAC/PHY) and control plane (RRC) protocol terminations with a user equipment (UE) 105. The e-NodeBs may be interconnected with each other by an X2 interface.

As discussed herein, e-NodeB 115 refers to a base station that provides radio access to UEs 105 within a given coverage area (e.g., 110-1, 110-2, 110-3). This coverage area is referred to as a cell. However, as is known, multiple cells are often associated with a single e-NodeB.

Channel 125 may provide UL and DL channels for signaling and data transmissions. For example, channel 125 may provide a channel for Broadcast Control Channel (BCCH), Physical Uplink Control Channel (PUCCH), Physical Uplink Shared Channel (PUSCH), Physical Downlink Control Channel (PDCCH), Physical Downlink Shared Channel (PDSCH) and the like.

Figure 2:
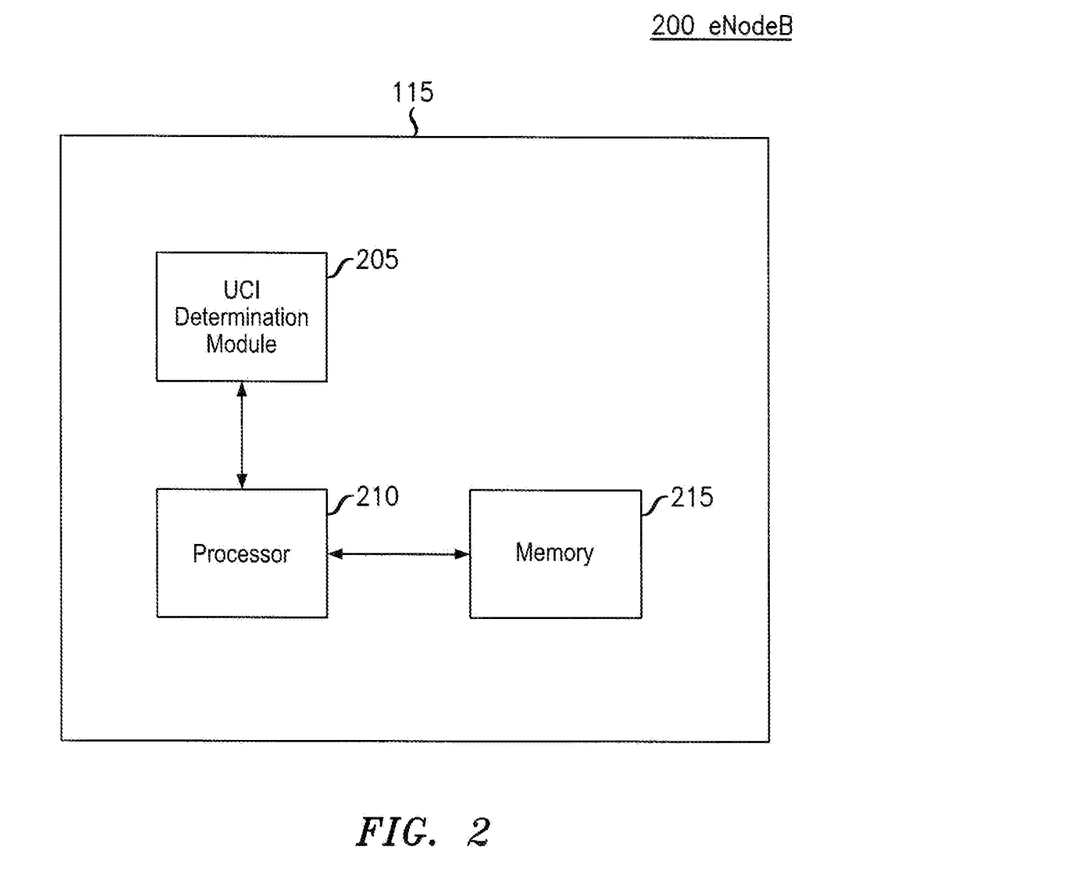
FIG. 2 illustrates an evolved Node B (e-NodeB) according to one example embodiment.

FIG. 2 illustrates an evolved Node B (e-NodeB) according to one example embodiment. As shown in FIG. 2, the e-NodeB 115 includes, at least, a UCI determination module 205, a processor 210 and a memory 215. The processor 210 and the memory 215 operate together to run e-NodeB functionality. For example, the memory 215 may store code segments regarding e-NodeB functions (e.g., UE scheduling, control information signaling/handling and the like). The code segments may in-turn be executed by the processor 210. Further, the memory 215 may store process variables and constants for use by the processor 210. Additional details regarding the processor 210 and the memory 215 are known to those skilled in the art and will not be discussed further for the sake of brevity.

The UCI determination module 205 may be hardware including an additional processor (not shown). For example, the UCI determination module 205 may be an application specific integrated circuit (ASIC) including self-contained hardware elements (e.g., a processor and a memory) configured to perform UCI functions as, for example software instructions. Alternatively, or in addition to, the UCI determination module 205 may be a software module configured to co-operate with the processor 210 and the memory 215 in order to execute UCI functions.

The UCI determination module 205 may be configured to determine a UCI reporting mode by a user equipment (e.g., UE 105) based on pre-defined rules and/or higher layer signaling. Further details regarding the operation of the e-NodeB 115 are discussed below with regard to FIG. 5.

Figure 3:
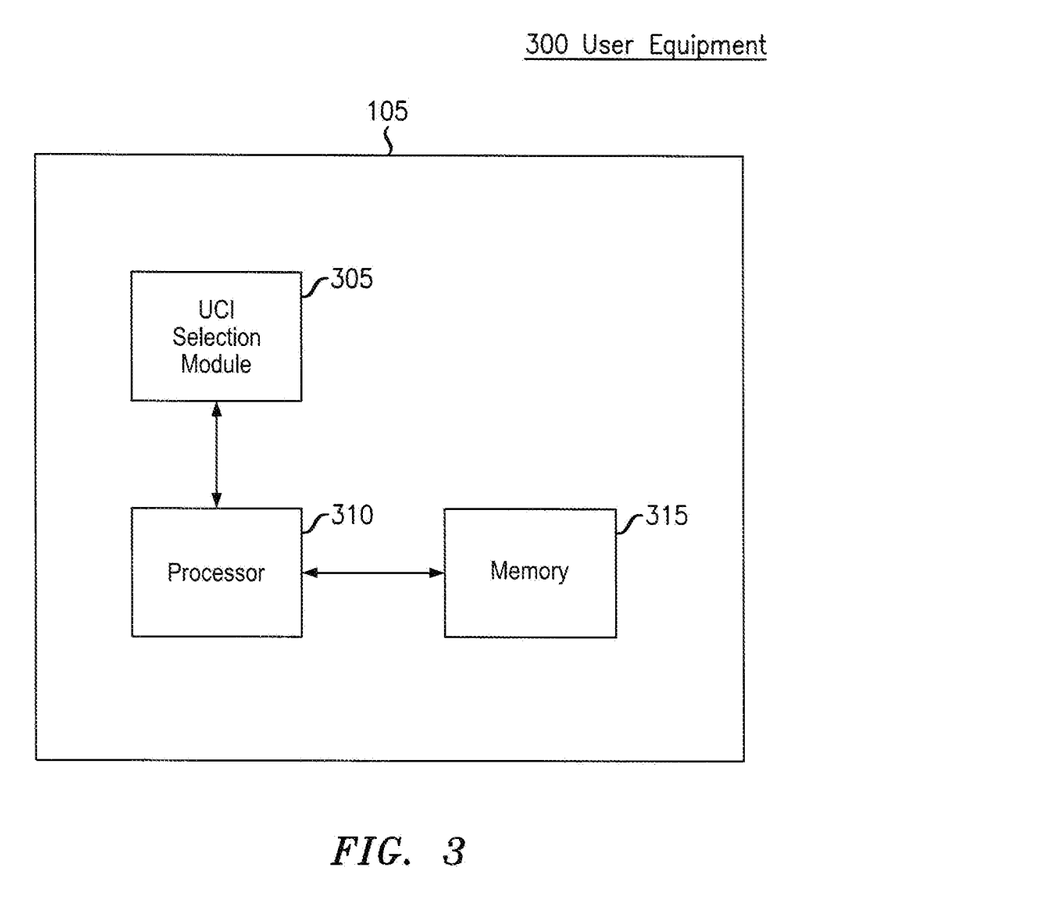
FIG. 3 illustrates a user equipment (UE) according to one example embodiment.

FIG. 3 illustrates a user equipment (UE) according to one example embodiment. As shown in FIG. 3, the UE 105 includes, at least, a UCI selection module 305, a processor 310 and a memory 315. The processor 310 and the memory 315 operate together to run UE functionality. For example, the memory 315 may store code segments regarding UE functions (e.g., data transfer, control information signaling/handling and the like). The code segments may in-turn be executed by the processor 310. Further, the memory 315 may store process variables and constants for use by the processor 310. Additional details regarding the processor 310 and the memory 315 are known to those skilled in the art and will not be discussed further for the sake of brevity.

The UCI selection module 305 may be hardware including an additional processor (not shown). For example, the UCI selection module 305 may be an application specific integrated circuit (ASIC) including self-contained hardware elements (e.g., a processor and a memory) configured to perform UCI functions as, for example software instructions. Alternatively, or in addition to, the UCI selection module 305 may be a software module configured to co-operate with the processor 310 and the memory 315 in order to execute UCI functions.

The UCI selection module 305 may be configured to select a UCI reporting mode based on factors such as whether the CSI report(s) is multiplexed with UL data, the payload size of the CSI report(s), the payload size of HARQ-ACK, and the payload size of UL data. Further details regarding the operation of the UE 105 are discussed below with regard to FIG. 4.

Figure 4:
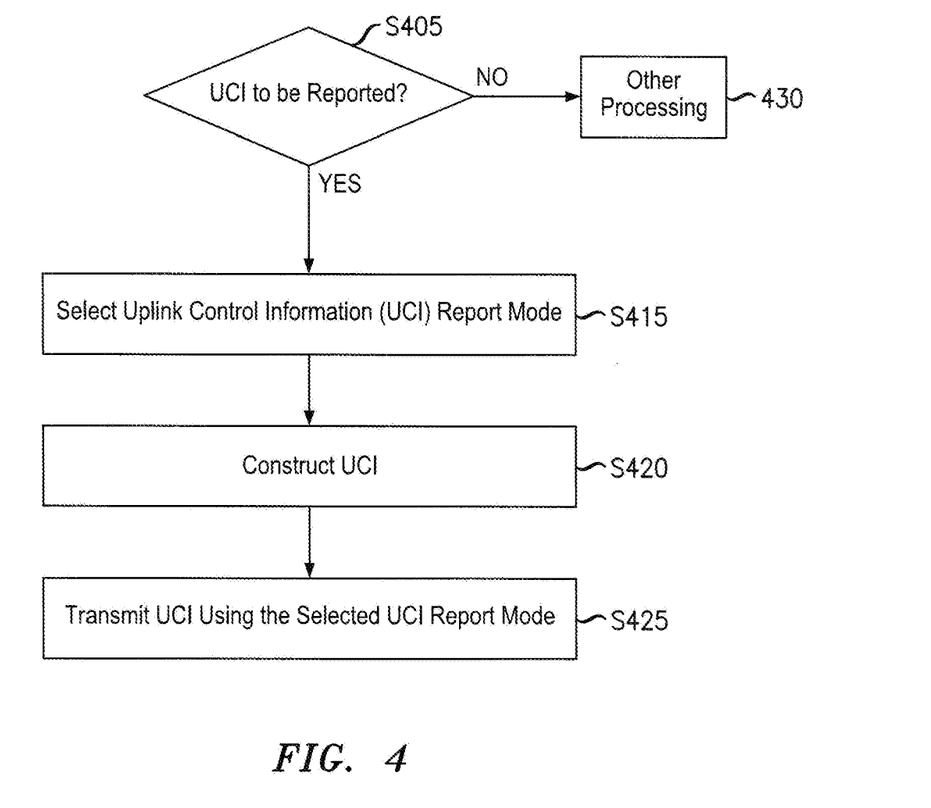
FIG. 4 illustrates a method of transmitting channel state information (UCI) according to one example embodiment.

FIG. 4 illustrates a method of transmitting UCI according to one example embodiment. While describing the steps of the method associated with FIG. 4, reference will be made to the network 100 of FIG. 1 and the User equipment 105 of FIG. 3.

In step S405 the processor 310 determines if a UCI is to be reported. The processor 310 may determine that there is a UCI to be reported based on factors including, but not limited to, a periodic schedule of reporting a UCI, if there is a HARQ-ACK to be transmitted and the HARQ-ACK and the UCI are in the same sub-frame. The periodic reporting of the UCI may be performed based on a periodic resource allocated on the PUSCH for transmission of the periodic UCI report(s). This allocation is typically by means of higher layer signaling. The configuration of the multiple reporting modes may be done together with the configuration of the periodic resource, for example as part of the same signaling message to the UE. If the processor 310 determines that there is no UCI to be reported the process proceeds to other types of processing at S430, where other types of processing may include any one of but not limited to, a transmission of data, waiting for the next sub-frame for determining whether a UCI needs to be reported, etc.

However, if the processor 310 determines, in step S405, that a UCI is to be reported, the UCI selection module 305 selects a UCI reporting mode from among one or more reporting modes, which may have been pre-programmed into the memory 315 (S415). Multiple reporting modes can be defined for example through being predefined by specification and/or defined and signaled using higher layer signaling. The UCI reporting modes may be any one of, but not limited to, a first mode which has the same CSI report format and content as the existing PUCCH periodic reporting mode 1-1 or a second reporting mode that has the same CSI report format and content as the existing PUSCH aperiodic reporting mode 3-1 as described in the 3GPP TS36.213.

The UCI selection module 305 may select a UCI reporting mode based on factors including, but not limited to, whether the UCI is multiplexed with UL data, the payload size of the UCI report(s), the payload size of HARQ-ACK, and the payload size of UL data.

As one particularly advantageous example, a UCI reporting mode with smaller payload size can be used when the CSI report(s) is multiplexed with UL data, so to minimize the impact on UL data transmission. When the CSI report(s) is sent over PUSCH alone (without UL data transmission), a reporting mode with larger payload size can be used to fully utilize the PRB resource allocated to the UE.

As another example, the UE applies more HARQ-ACK bundling to reduce the payload size of HARQ-ACK when HARQ-ACK is multiplexed with UL data. When HARQ-ACK is sent over PUSCH alone (without UL data transmission), no bundling or less bundling is applied so that more accurate HARQ-ACK feedback can be provided to improve the downlink throughput.

As another example, the UE uses the UCI reporting mode (including the reporting mode for both CSI and HARQ-ACK) with smaller payload size only if it is multiplexed with UL data and the size of the larger payload reporting exceeds a certain threshold. For example, the threshold may be such that the size of the larger payload reporting would have a significant impact on the reliability of the UL data transmission. Otherwise, the UE uses the reporting mode with larger payload size.

As another example, the UE uses the UCI reporting mode with smaller payload size if the amount of data with which it is multiplexed is larger than a threshold. For example, the threshold may be such that a combination of data and control information would exceed a number of PRBs (e.g., 1 PRB). Otherwise, the UE uses the larger payload size.

As another example, the UE uses the UCI reporting mode with smaller payload size if the total size of the larger payload combined with the data with which it is multiplexed exceeds a threshold. For example, the threshold may be such that the combination of data and control information would exceed a number of PRBs (e.g., 1 PRB). Typically the total size would be after channel coding of the data (i. g. the total number of coded bits). Otherwise the UE uses the reporting mode with larger payload size.

As another example, the UE uses the smaller UCI payload size if the amount of resource (e.g. in terms of number of PRBs) used for the multiplexed UCI and data is less than a threshold, and the larger CSI payload size if the number of PRBs used is larger than the threshold (e.g. >1). For example, the threshold may be equal to the smallest possible resource allocation, (i.e. a single PRB), in LTE. This approach avoids the need for the e-NodeB to send dynamic signaling to the UE to indicate the UCI reporting mode. At the same time, the multi-mode definition allows the UE to adjust the payload size accordingly in different scenarios.

Upon selecting an appropriate UCI reporting mode, the processor 310 constructs the UCI in S420, based on the selected reporting mode. In one embodiment, for a UE with 5 component carriers, the e-NodeB can use higher layer signaling to configure the CSI report(s) for all the 5 component carriers to be sent at the same time. At the same time, two reporting modes such as reporting mode 1-1 and reporting mode 3-1, as explained above are configured by the higher layer signaling. In every sub-frame when the UE needs to report CSI, it checks whether there is UL data to be transmitted in the same sub-frame. If yes, the CSI report(s) is constructed using reporting mode 1-1, with wideband Channel Quality Indicator (CQI) and single Precoding Matrix Indicator (PMI), thus resulting in a smaller control information payload. Otherwise, the CSI report(s) is constructed using reporting mode 3-1, with sub-band CQI and single PMI, thus resulting in a larger control information payload. Alternatively, if there is UL data to be transmitted in the same -sub-frame, the CSI report(s) may be constructed so as to include information for a larger subset (or all 5) of the component carriers, or the CSI report(s) is constructed so as to include information for a smaller subset of the 5 component carriers.

Figure 5:
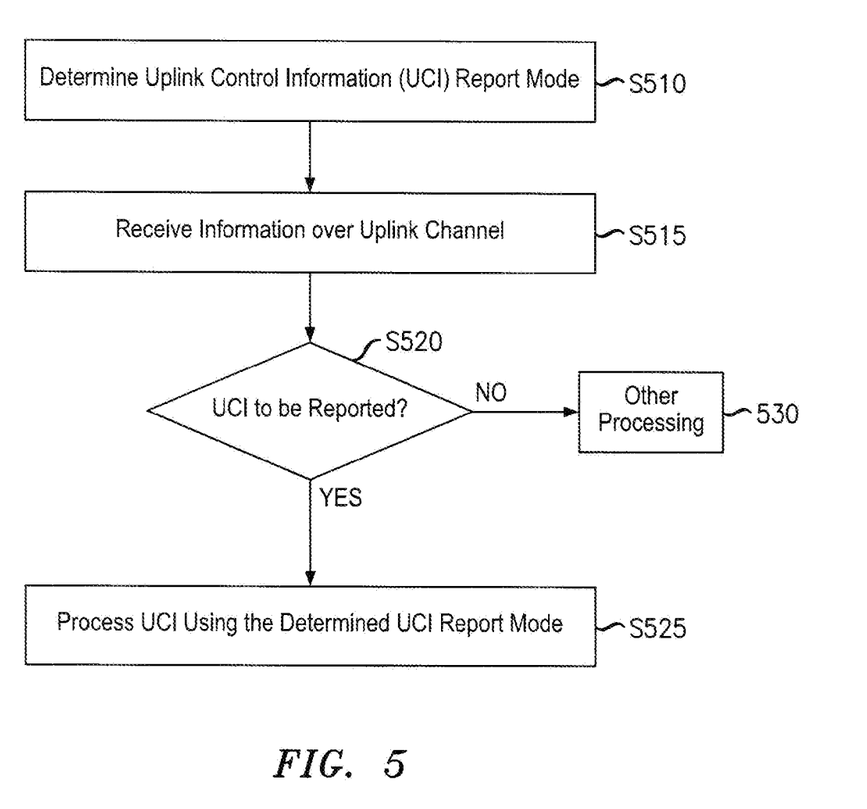
FIG. 5 illustrates a method of receiving channel state information (UCI) according to one example embodiment.

In step S425 the processor 310 transmits the UCI using the selected UCI reporting mode. FIG. 5 illustrates a method of receiving UCI according to an example embodiment. While describing the steps of the method associated with FIG. 5, reference will be made to the network 100 of FIG. 1 and the e-NodeB 115 of FIG. 2.

In step S510 the UCI determination module 205 determines the selected UCI reporting mode. The UCI determination module may determine the selected UCI reporting mode according to the process described with respect to S405. Alternatively, the UCI determination module 205 may determine the selected UCI reporting mode based on a signal received from the UE informing the e-NodeB of the UCI reporting mode selected by the UCI determination module 305 of the UE.

In step S515 the processor 210 receives information over an uplink channel (e.g., PUSCH). In step S520 the processor 210 determines if the information includes UCI. The processor 210 may determine that the received information includes UCI based on factors including, but not limited to, a periodic schedule of reporting a UCI, if there is a HARQ-ACK to be received and the HARQ-ACK and the UCI are in the same sub-frame, etc.

If the processor 210 in S520 determines that the received information includes a UCI, the processor 210 processes the UCI using the UCI reporting mode determined by the UCI determination module 205 in S510. For example, the processor 210 processes the received information by decoding the received information at S525. However, if the processor 210 determines that the received information does not include a UCI, the process proceeds to other types of processing at S530. The other types of processing may be any one of, but not limited to, decoding data, taking no action in the current sub-frame, etc.

The same approach can be used when CSI report(s) and HARQ-ACK are transmitted in the same sub-frame, or when only one type of information (either CSI report(s) or HARQ-ACK) is transmitted in a sub-frame. Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

While example embodiments have been particularly shown and described, it will be understood by one of ordinary skill in the art that variations in form and detail may be made therein without departing from the spirit and scope of the claims.

Variations of the example embodiments are not to be regarded as a departure from the spirit and scope of the example embodiments, and all such variations as would be apparent to one skilled in the art are intended to be included within the scope of this disclosure.

What is claimed:

1. A method comprising:
selecting, by a mobile unit, one of a plurality of control information reporting modes for transmitting one or more control information reports based on at least one of a payload size of the one or more control information reports, a payload size of data multiplexed with the one or more control information reports and an amount of resources used for multiplexing the one or more control information reports with the data;
constructing, by the mobile unit, a message based on the selected one of the plurality of control information reporting modes, the message including the one or more control information reports and the data, the selected one of the plurality of control information reporting modes determining a payload size of the message; and
transmitting the message periodically or aperiodically, by the mobile unit, to a base station using the selected one of the plurality of control information reporting modes.

2. The method of claim 1, further comprising:
determining whether one or more control information need to be reported; and
constructing the one or more control information report(s) to be transmitted to the base station upon determining that the one or more control information need to be reported.

3. The method of claim 2, wherein the control information is at least one of channel state information (CSI) and acknowledgement information.

4. The method of claim 1, wherein the selecting further selects the one of the plurality of control information reporting modes based on control information transmission type, the control information transmission type being the one or more control information report(s) being multiplexed with uplink (UL) data.

5. The method of claim 4, wherein the selecting selects as the one of the plurality of control information reporting modes, a control information reporting mode with a smaller payload size compared to at least one other control information reporting mode with a larger payload size, upon the one or more control information being multiplexed with the UL data.

6. The method of claim 4, wherein the selecting selects as the one of the plurality of control information reporting modes, a control information reporting mode with a smaller payload size compared to at least one other control information reporting mode with a larger payload size, only if the payload size of the control information reporting mode with the smaller payload size multiplexed with the UL data exceeds a first threshold.

7. The method of claim 4, wherein the selecting selects as the one of the plurality of control information reporting modes, a control information reporting mode with a smaller payload size compared to at least one other control information reporting mode with a larger payload size, if an amount of data with which the control information according to the control information reporting mode with the smaller payload size is multiplexed, is larger than a first threshold.

8. The method of claim 4, wherein
the selecting selects as the one of the plurality of control information reporting modes, a control information reporting mode with a smaller payload size compared to at least one other control information reporting mode with a larger payload size, if an amount of resource used for multiplexing the one or more control information report(s) with the UL data is less than a first threshold, and
the selecting selects as the one of the control information reporting modes, the at least one other control information reporting mode with the larger payload size if the amount of resource used for multiplexing the one or more control information report(s) with the UL data is greater than the first threshold.

9. The method of claim 8, wherein the amount of resources used is a number of physical resource blocks (PRBs), and
the third threshold is equal to 1 PRB.

10. The method of claim 1, wherein the one or more control information report(s) is transmitted over a UL data channel.

11. A method comprising:
determining, by a base station, one of a plurality of control information reporting modes based on at least one of a payload size of one or more control information reports, a payload size of data multiplexed with the one or more control information reports and an amount of resources used for multiplexing the one or more control information reports with the data;
receiving, by the base station, a message over an uplink (UL) data channel, the message including the one or more control information reports and the data, the message having been constructed based on the determined one of the plurality of control information reporting modes, the determined one of the plurality of control information reporting modes determining a payload size of the message, the message having been transmitted to the base station based on at least one of a periodic and aperiodic transmission; and
processing, by the base station, the one or more control information report(s) from the received message using the determined one of the plurality of control information reporting modes.

12. The method of claim 11, further comprising:
determining whether the received message includes one or more control information, wherein
the processing is carried out upon determining that the received message includes the one or more control information.

13. The method of claim 12, wherein the control information is at least one of channel state information (CSI) and acknowledgement information.

14. The method of claim 11, wherein the UL data channel is at least one of a channel for Broadcast Control Channel (BCCH), a Physical Uplink Control Channel (PUCCH), a Physical Uplink Shared Channel (PUSCH), a Physical Downlink Control Channel (PDCCH) and a Physical Downlink Shared Channel (PDSCH).

15. A mobile device comprising:
a processor configured to,
select one of a plurality of control information reporting modes for transmitting one or more control information reports based on at least one of a payload size of the one or more control information reports, a payload size of data multiplexed with the one or more control information reports and an amount of resources used for multiplexing the one or more control information reports with the data;
construct a message based on the selected one of the plurality of control information reporting modes, the message including the one or more control information reports and the data, the selected one of the plurality of control information reporting modes determining a payload size of the message; and transmit the message periodically or aperiodically, to a base station using the selected one of the plurality of control information reporting modes.

16. The mobile device of claim 15, wherein the processor is further configured to, determine whether one or more control information need to be reported; and construct the one or more control information report(s) to be transmitted to the base station upon determining that the one or more control information need to be reported.

17. A base station comprising:

a processor configured to, determine one of a plurality of control information reporting modes based on at least one of a payload size of one or more control information reports, a payload size of data multiplexed with the one or more control information reports and an amount of resources used for multiplexing the one or more control information reports with the data;

receive a message over an uplink (UL) data channel, the message including the one or more control information reports and the data, a message over an uplink (UL) data channel, the message including the one or more control information reports and the data, the message having been constructed based on the determined one of the plurality of control information reporting modes, the determined one of the plurality of control information reporting modes determining a payload size of the message, the message having been transmitted to the base station based on at least one of a periodic and aperiodic transmission; and process the one or more control information report(s) from the received message using the determined one of the plurality of control information reporting modes.

18. The base station of claim 17, wherein the processor is further configured to:

determine whether the received message includes one or more control information, wherein the processing is carried out upon determining that the received message includes one or more control information report(s).

* * * * *